United States Patent [19]

Danbom

[11] Patent Number: 4,783,770
[45] Date of Patent: Nov. 8, 1988

[54] METHOD OF THREE-COMPONENT REFLECTION SEISMOLOGY

[75] Inventor: Steve H. Danbom, Ponca City, Okla.

[73] Assignee: Conoco Inc., Ponca City, Okla.

[21] Appl. No.: 713,187

[22] Filed: Mar. 18, 1985

[51] Int. Cl.⁴ .................................................. G01V 1/00
[52] U.S. Cl. ...................................... 367/53; 367/40; 367/75
[58] Field of Search .................. 367/58, 75, 56, 70, 367/40, 50, 178, 53; 364/421

[56] References Cited

U.S. PATENT DOCUMENTS

| | | | |
|---|---|---|---|
| 3,344,881 | 10/1967 | White | 367/178 |
| 3,397,754 | 8/1968 | Roden | 367/58 |
| 3,401,400 | 9/1968 | Lindsey | 367/70 |
| 4,458,341 | 7/1984 | Goebel | 367/58 |
| 4,577,298 | 3/1986 | Hinkley | 367/50 |

Primary Examiner—Thomas H. Tarcza
Assistant Examiner—Daniel T. Pihulic
Attorney, Agent, or Firm—Ronald J. Carlson; Cortlan R. Schupbach; Frank J. Kowalski

[57] ABSTRACT

A method of three-component seismology wherein seismic energy induced vertical, radial and transverse particle movement is detected at plural spaced positions along a survey line to produce orthogonal data signals, and the different orthogonal data signals are variously processed both separately and interactively to develop novel signal relationships which improve indication and identification of steeply dipping reflections, out-of-plane reflections, and the like.

5 Claims, 3 Drawing Sheets

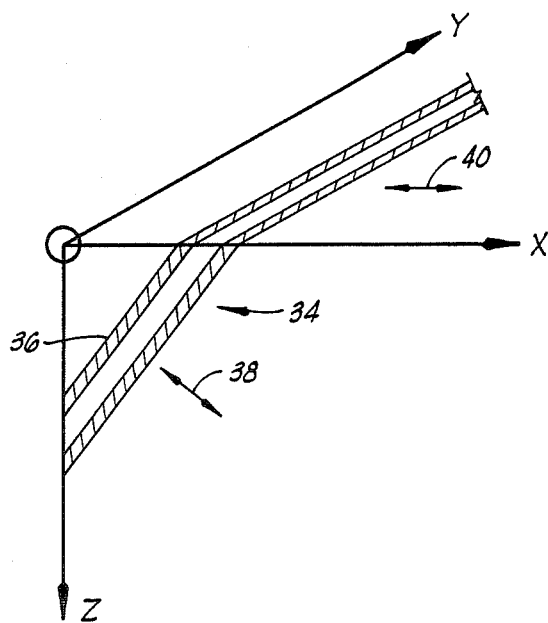
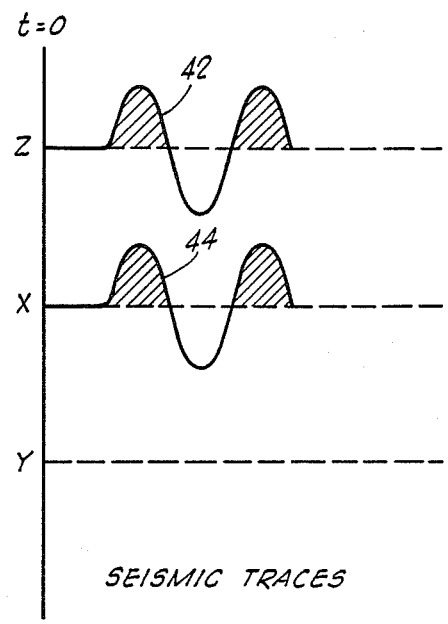
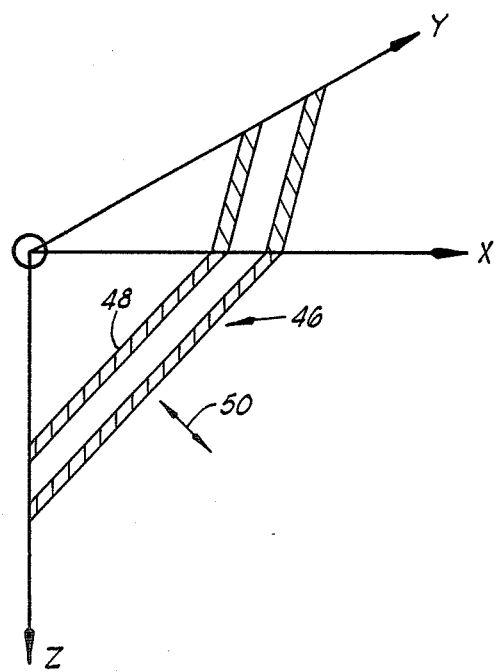
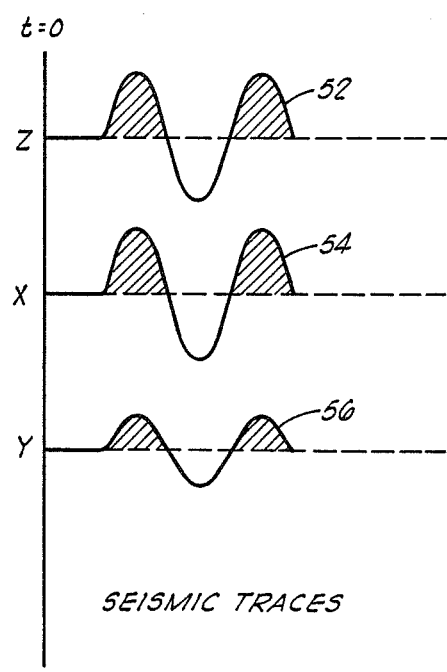
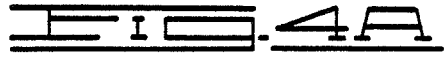
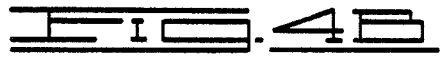

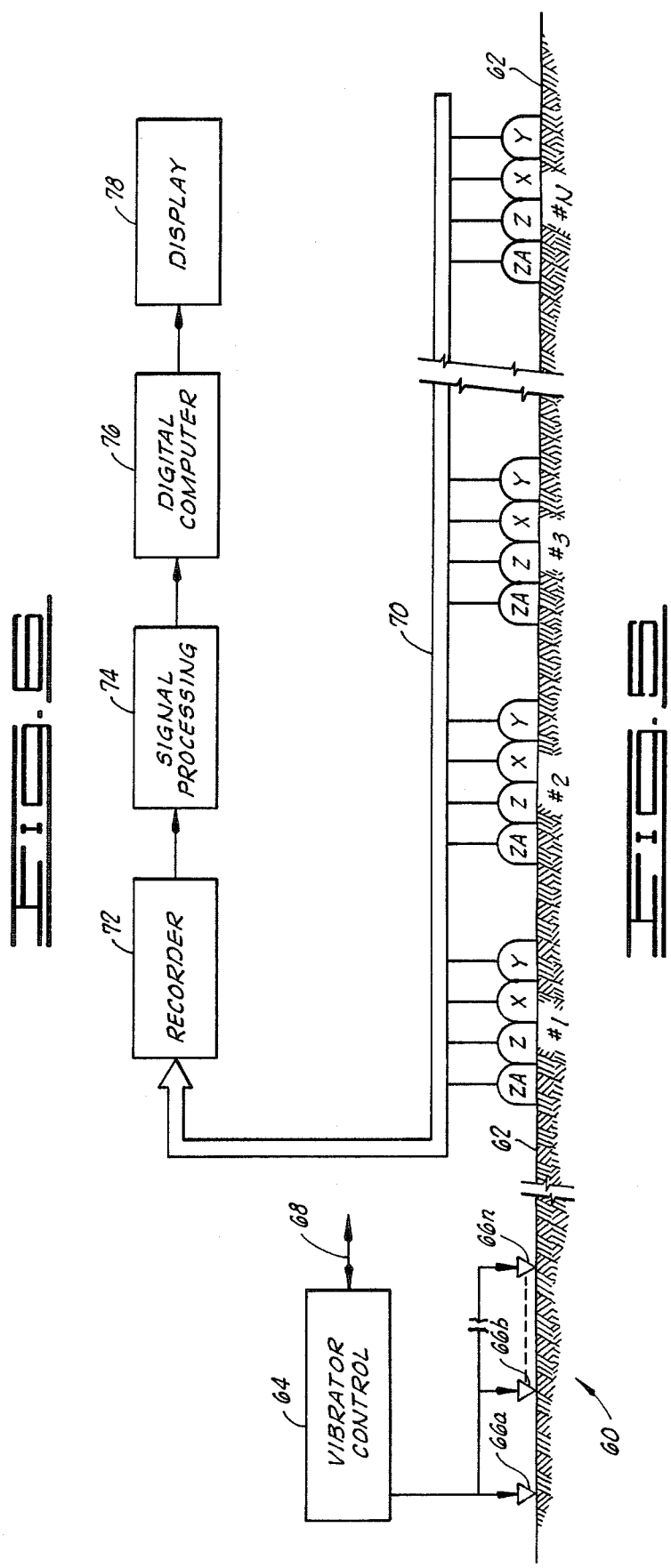

METHOD OF THREE-COMPONENT REFLECTION SEISMOLOGY

BACKGROUND OF THE INVENTION

1. Field of the Invention

The invention relates generally to seismic exploration practices and, more particularly, but not by way of limitation, it relates to an improved method of seismology wherein particle motion of received energy simultaneously measured in three orthogonal directions is sensed in order to establish a more meaningful relationship between the final produced seismic section and the geology that caused the response.

2. Description of the Prior Art

The prior art teaches numerous forms of seismic exploration wherein induced seismic energy is subsequently received at variously arrayed detectors for processing and interpretation as to the subterrain. While there is certainly an awareness that seismic energy input to the earth will result in varying forms of compressional- and shear-wave responses, there has not been an organized attempt to utilize orthogonally measured particle motion as simultaneously measured in a survey to improve the output information. The closest prior art discovered by Applicant is a publication entitled "Seismic Signal Enhancement With Three-Component Detectors"—Shimshoni and Smith; *GEOPHYSICS*, Vol. XXIX, No. 5 (October, 1964), pp 664–671. This teaching actually relates to the use of three-component detection for analysis of long-range seismic data generated by an earthquake. In this application, the signal polarization properties contribute meaningful data as a relatively few detectors are utilized to compile primarily directional information relating to the seismic disturbance. Signal processing in this case emphasizes P and SV waves and no use of the transverse component was made in analyzing earthquake seismograms.

SUMMARY OF THE INVENTION

The present invention relates to an improvement in seismic sounding techniques wherein an area is explored along a seismic survey line utilizing a conventional, compressional-wave seismic energy generator but receiving reflected seismic energy through groups of detectors, each responsive to a different orthogonal component of motion. Thus, the present method functions to compile orthogonally related seismic data at known spacing along a survey line for subsequent directionally sensitive processing in order to provide better seismic reflection indications of steeply dipping formations, differentiation between in-plane and out-of-plane reflections, and avoidance of excessive horizontally traveling noise.

Therefore, it is an object of the present invention to provide a method of seismic exploration that enables obtaining additional dimensions of information for a subsurface point of interest.

It is also an object of the present invention to provide a seismic exploration method that defines steeply dipping geological formations and out-of-plane data responses.

Finally, it is an object of the present invention to provide a novel method of orthogonal seismic energy detection for separate and interactive signal processing to increase data output quality for subsequent interpretation.

Other objects and advantages of the invention will be evident from the detailed description when read in conjunction with the accompanying drawings which illustrate the invention.

BRIEF DESCRIPTION OF THE DRAWINGS

FIGS. 3A and 3B illustrate graphically the characteristics of a dip-line, steep dip, P-wave reflection;

FIGS. 4A and 4B illustrate graphically the characteristics of an oblique-line, steep dip, P-wave reflection;

FIG. 5 is an idealized block form layout of a three-component seismic survey line; and FIG. 6 is a numerical representation of a three-component seismic line such as that of FIG. 5.

DETAILED DESCRIPTION OF THE INVENTION

Reflections originating from steep dip formations are extremely difficult to image in usual seismic exploration practices. There are three problems that can be encountered whereby the meaningful seismic energy is entirely scrambled or masked over. First, when using the common-depth-point style of data acquisition and processing, the common-depth-point degenerates to a line with increasing dip causing a smearing of the reflection energy.

Secondly, a large surface array of geophones when field summed to one channel cannot separate horizontally traveling noise from the horizontal component of the reflections from steeply dipping rock formations. The present techniques are designed for signal enhancement of reflections from relatively horizontal layers, and the received reflection signals tend to diminish with increase of formation dip.

A third problem with conventional seismic sounding is the difficulty in determining which reflections came from within the plane of the seismic section. That is, whether or not the reflections actually originated from on or near the vertical section plane or whether they originated off at a lateral distance-thereby to place a troublesome, out-of-plane event response in the data. In the present method, use of the three-component data and interactive signal processing enables proper separation of data to the eventual improvement of the seismic plot.

Figure 1A:
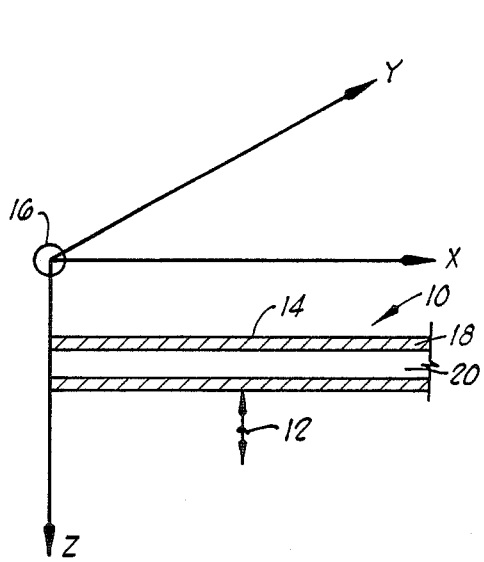
FIGS. 1A and 1B illustrate graphically the characteristics of a no-dip, P-wave reflection.
Figure 1B:
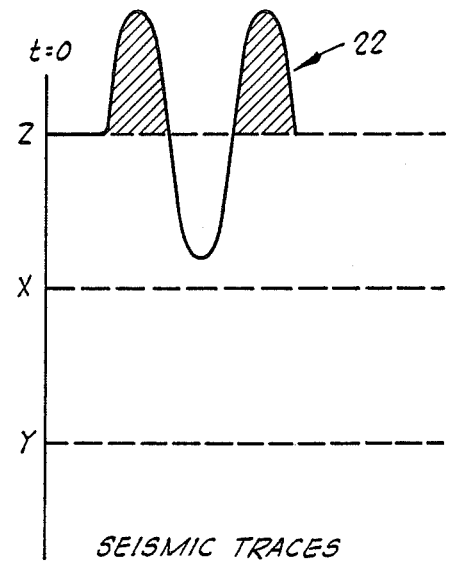

FIGS. 1A–1B through FIGS. 4A–4B provide idealized, graphic depiction of selected wave motion orientation relative to their respective orthogonal signal components. FIG. 1A illustrates a purely vertically traveling P-wave reflection 10 having particle motion as shown by arrow 12, all such motion being along the z-axis. As wave front 14 approaches a three-component geophone 16, the cross-hatching indicates compression 18 versus rarefraction 20 as is also carried through in the wave representation 22 of FIG. 1B. Thus, as shown in FIG. 1B, the wave 22 is comprised entirely of vertical particle motion along the z-axis, there being no sensed motion along the respective x and y axes.

Figure 2A:
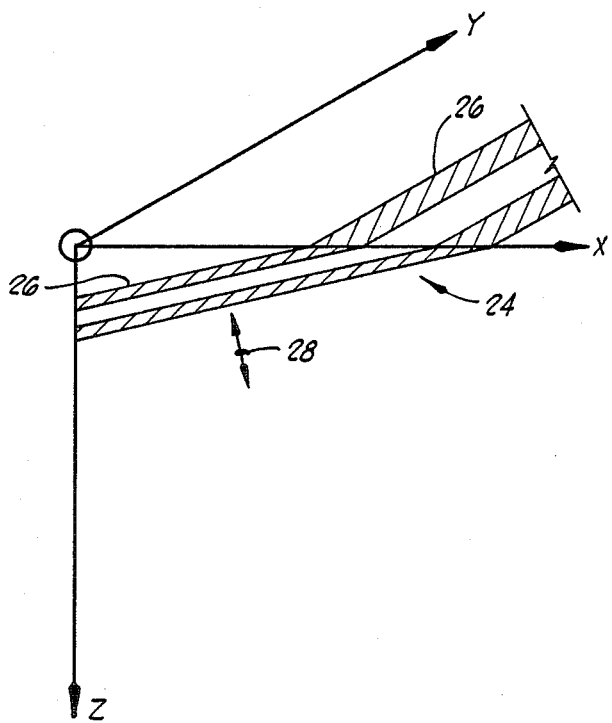
FIGS. 2A and 2B illustrate graphically the characteristics of a dip-line, slight dip, P-wave reflection.
Figure 2B:
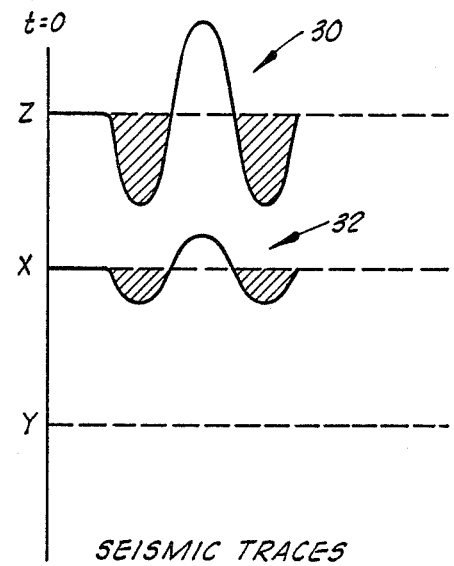

FIG. 2A illustrates a P-wave reflection from a slightly dipping formation as wave 24 with wave front 26 moves with particle motion as defined by arrow 28. Since the wave 24 originates from a formation of slight dip in the x-z plane, some radial particle motion shows up along the x-axis. Thus, FIG. 2B shows a wave 30 that exhibits still a strong particle motion along the z-axis, and a lesser wave 32 that exhibits a diminished particle motion along the x-axis. These events (30 and 32) necessarily have the same phase relationship. There is no component of y-axis particle motion.

FIG. 3A illustrates a seismic wave 34 having wave front 36 and exhibiting particle motion as along arrows 38, 40 as the wave originates reflecting from a steep dipping formation in the x-z plane. Thus, and referring to FIG. 3B, there is an evenly divided amplitude of particle motion as waveform 42 along the vertical z-axis is essentially equal to waveform 44 along the radial x-axis. There is still no detection of particle motion along the transverse or y-axis.

Finally, FIGS. 4A and 4B illustrate a steep dip P-wave reflection that originates from a position that is oblique relative to the seismic section plane. The seismic wave 46 having wave front 48 moves as with particle motion arrow 50 primarily in the x-z plane, but there is also a component moving along the y-axis. Thus, the top two seismic traces of FIG. 4B would show approximately equal waveform response as between z-axis waveform 52 and x-axis waveform 54. A lesser y-axis response shown by waveform 56 is also present. Thus, it can be seen that proper processing and comparison of orthogonal data signals can enable three-component particle motion considerations to be used in differentiation of steeply dipping and off-plane reflections.

FIG. 5 illustrates the field layout for a three-component seismology system wherein a conventional seismic energy source is located at a source position 60 and a linear array of seismic detectors are aligned at selected spacing therefrom along earth surface 62. Any conventional seismic source may be utilized in carrying out the invention but it is shown with a seismic vibrator source. Thus, vibrator control 64 is disposed at source point 60 and may generate one or more input energy sweeps at spaced locations $66a$, $66b$–$66n$. The vibrator control 64, effective at successive locations $66a$–$66n$, is controlled from a central location, usually a recorder truck, via either transmitter connection or wireline 68.

The receiver layout may consist of such as a long, multi-connductor cable 70 that provides connection to seismic detectors at each of a plurality of linearly aligned stations number 1–N. In a preferred form, each ground position number 1–N includes a plurality of differently oriented seismic detectors, each connected via separate wireline through multi-conductor cable 70 to a multi-channel recorder 72. Each ground position may then include such as a linear array of vertical particle velocity detectors $ZA_{NM}$ for deriving M time samples at N receiver locations. The relationship is also illustrated numerically in FIG. 6 wherein recorder trace number and measurement per ground position are listed. Also at each ground position, there is single point vertical particle velocity detection $Z_{NM}$, single point radial particle velocity detection $X_{NM}$, and single point transverse particle velocity detection $Y_{NM}$.

The multi-trace recorder 72 may be a very large commercially available type, e.g. ninety-six or even greater parallel channels of recording. Selected outputs from recorder 72 may be applied through multi-channel processing stages 74 with further processing carried out in digital computer 76 for output at display 78. Once field signals have been obtained and recorded, the signal processing of data can be performed using any of a number of known seismic data processing operations. Thus, summed vertically oriented array data from geophones ZA may be conducted from each ground position 1–N for separate channel recording at recorder 72, and this file of data can then be processed for static and dynamic corrections and further processed through any of many refinement procedures in the digital computer 76. The various output display capabilities are well-known in the technology. In like manner, each of the point vertically oriented detectors Z, radially oriented detectors X and transversely oriented detectors Y are similarly conducted and recorded multi-channel for subsequent processing alone or interactively with the various selected components.

As shown in FIG. 6, four signals are compiled at each ground position $ZA_{NM}$, $Z_{NM}$, $X_{NM}$ and $Y_{NM}$, and these are treated as separate traces in the recording and processing system. The different orthogonal components of data are collected as conventional seismic tape files in the recording process.

Besides the conventional data processing routines, the multi-component seismic trace data can be subjected to further innovative processing steps. Thus, instead of using the structurally inept common-depth-point imaging techniques to increase signal level, the procedure can take advantage of the fact that for compressional-wave reflection events, the $Z_{NM}$ and $X_{NM}$ components are in-phase. Therefore, interactive processing of the component data can be utilized to form an additive trace $A_{NM}$ such as $$A_{NM} = Z_{NM} + X_{NM} \qquad (1)$$

which will realize an increased signal level with reduction in random noise as well as better defined dipping responses. As shown in FIGS. 1B–4B, the Z and X components are all inphase and re-enforcing in any additive combination.

A modulus trace can also be developed by digital processing and formation of a trace $B_{NM}$ wherein $$B_{NM} = [(Z_{NM})^2 + (X_{NM})^2]^{\frac{1}{2}} \qquad (2)$$

Thus, we derive a modulus factor $B_{NM}$ that is a function of both the Z and X component values.

Still further, intermediate cross-correlation of Z and X traces can develop a trace $C_{Nj}$ which adheres to the following relationship $$C_{Nj} = \sum_{i=-n}^{n} (Z_{N(i+j)}) \cdot (X_{N(i+j)}) \qquad (3)$$

and the intermediate value $C_{Nj}$ may be utilized to further form $D_{NM} = (C_{Nj}) \cdot (Z_{NM})$ where the derived value $D_{NM}$ represents a cross-correlation enhanced output.

The developed traces $A_{NM}$, $B_{NM}$ and $D_{NM}$ may then be used as new traces that can be processed in still further conventional ways to derive more meaningful output display for interpretive purposes. The common-depth-point redundancy measures may have been obviated or by-passed due to the signal enhancement enabled by the development of one or more of the summation trace, modulus trace and/or cross-correlation enhanced traces.

Further processing can be carried out using the $Y_{NM}$ data to ascertain whether or not the reflection event originated from within the plane of the seismic section. FIGS. 4A and 4B illustrate the relationship wherein there also exists a Y component of data which can be considered as an indicator of offplane reflection origin.

Thus, in-plane reflection origin can be tested by processing $Y_{NM}$ data with parameters appropriate for and derived from the $Z_{NM}$ data. Any reflections that image on the $Y_{NM}$ section indicate an out-of-plane component. That is, by first processing the $Z_{NM}$ data as a seismic section and subsequently processing the $Y_{NM}$ data as a seismic section with similar parameters of surface distance (offset) and time (depth), simple visual comparison of the Y and Z seismic sections will indicate areas of probable out-of-plane interference. Further subtractive processing can then be attempted to remove or clean up the Z data seismic section.

Alternatively, the $Y_{NM}$ data can be utilized directly to alter $Z_{NM}$ by utilizing an instantaneous threshold function for elimination of out-of-plane data indications. Thus, computer processing can establish that a $Y_{ij}$ value greater than a pre-set threshold will set $Z_{ij}$ equal to zero. Thus, T is some preselected amplitude conherency threshold which, if exceeded, sets the instantaneous value $Z_{ij}$ to zero thereby removing any out-of-plane element from the $Z_{NM}$ seismic section data prior to processing and display.

Yet another display approach using color overlay provides highly effective out-of-plane indication. The $Z_{NM}$ data is first processed to output a standard seismic section whereupon a selected color hue and intensity overplot is placed on the $Z_{NM}$ data section in accordance with the amplitude of time-coincident $Y_{NM}$ data as separately processed. Thus, hue and intensity of the color overplot can provide an indication of the amount of out-of-plane component for each seismic reflection event.

The foregoing discloses a novel method for three-component seismology wherein orthogonally related seismic data is received and processed to provide an increased dimension of data. Thus, reflected seismic energy is detected and classified as to vertical, radial or transverse motion relative to the survey line and interactive analysis enables development of more meaningful seismic section data. The three-component data introduces a consideration which enables identification of out-of-plane reflected signals and more accurate determination of reflections originating from steeply dipping formation interfaces.

Changes may be made in combination and arrangement of elements as heretofore set forth in the specification and shown in the drawings; it being understood that changes may be made in the embodiment disclosed without departing from the spirit and scope of the invention as defined in the following claims.

The embodiments of the invention in which an exclusive property of privilege is claimed are defined as follows:

1. A method of three-component reflection seismology over selected earth surface for identification of dipping reflections, comprising:
    generating seismic energy in at least one source point on the earth surface;
    receiving reflected seismic energy at each of a plurality of spaced receiver points arrayed with said source point to delineate a plane seismic section, each receiver point including orthogonally aligned seismometers for detecting data signals for each of vertical particle velocity, radial particle velocity and transverse particle velocity;
    recording separately each plurality of data signals for the vertical, radial and transverse particle velocities; and
    processing said pluralities of data signals separately and interactively to define better those reflections emanating from steeply dipping geological formation boundaries and to differentiate those reflections originating from out of the plane of the seismic section, and including processing of the plurality of vertical data signals and plurality of radial data signals and cross-correlating to output a correlation signal for subsequent multiplying with said vertical data signals to output an enhanced vertical signal.

2. A method as set forth in claim 1 wherein:
    each receiver point also includes a plurality of vertical seismometers connected in predetermined array to provide a summation vertical particle velocity data signal; and
    summation vertical data signals for all receiver points are processed for interactive processing with said vertical, radial and transverse data signals.

3. A method as set forth in claim 1 which further includes:
    outputting the vertical data signals as a seismic section and overplotting in selected color intensity in accordance with the amplitude and coherence of the instantaneous transverse data signal to indicate the out-of-plane component for each reflection.

4. A method of three-component reflection seismology over selected earth surface for identification of dipping reflections, comprising:
    generating seismic energy in at least one source point on the earth surface;
    receiving reflected seismic energy at each of a plurality of spaced receiver points arrayed with said source point to delineate a plane seismic section, each receiver point including orthogonally aligned seismometers for detecting data signals for each of vertical particle velocity, radial particle velocity and transverse particle velocity;
    recording separately each plurality of data signals for the vertical, radial and transverse particle velocities; and
    processing said pluralities of data signals separately and interactively to define better those reflections emanating from steeply dipping geological formation boundaries and to differentiate those reflections originating from out of the plane of the seismic section, and including processing the plurality of transverse data signals for comparison with the plurality of vertical data signals to differentiate reflections originating from out of the plane of the seismic section and establishing an amplitude coherency threshhold which, if exceeded by the instantaneous amplitude of a transverse data signal, sets the amplitude value of the corresponding instantaneous vertical data signal to zero.

5. A method as set forth in claim 4 which further includes:
    outputting the vertical data signals as a seismic section and overplotting in selected color intensity in accordance with the amplitude and coherence of the instantaneous transverse data signal to indicate the out of plane component for each reflection.

* * * * *